United States Patent [19]
Porterfield

[11] Patent Number: 6,069,638
[45] Date of Patent: May 30, 2000

[54] SYSTEM FOR ACCELERATED GRAPHICS PORT ADDRESS REMAPPING INTERFACE TO MAIN MEMORY

[75] Inventor: A. Kent Porterfield, New Brighton, Minn.

[73] Assignee: Micron Electronics, Inc., Nampa, Id.

[21] Appl. No.: 08/882,428

[22] Filed: Jun. 25, 1997

[51] Int. Cl.[7] ................................................. G06F 12/06
[52] U.S. Cl. ........................ 345/516; 345/521; 711/202
[58] Field of Search ................................ 345/501–506, 345/520, 521, 525, 512, 203, 516; 711/100, 117–119, 122, 141–143, 200–209, 221

[56] References Cited

U.S. PATENT DOCUMENTS

| | | |
|---|---|---|
| 4,937,734 | 6/1990 | Bechtolsheim . |
| 4,969,122 | 11/1990 | Jensen . |
| 5,121,487 | 6/1992 | Bechtolsheim . |
| 5,133,058 | 7/1992 | Jensen . |
| 5,155,816 | 10/1992 | Kohn . |
| 5,222,222 | 6/1993 | Mehring et al. . |
| 5,263,142 | 11/1993 | Watkins et al. . |
| 5,265,213 | 11/1993 | Weiser et al. . |
| 5,265,227 | 11/1993 | Kohn et al. . |
| 5,265,236 | 11/1993 | Mehring et al. . |
| 5,305,444 | 4/1994 | Becker et al. . |
| 5,313,577 | 5/1994 | Meinerth et al. . |
| 5,315,696 | 5/1994 | Case et al. . |
| 5,315,698 | 5/1994 | Case et al. . |
| 5,321,806 | 6/1994 | Meinerth et al. . |
| 5,321,807 | 6/1994 | Mumford . |
| 5,321,810 | 6/1994 | Case et al. . |
| 5,321,836 | 6/1994 | Crawford et al. . |
| 5,361,340 | 11/1994 | Kelly et al. . |
| 5,392,393 | 2/1995 | Deering . |
| 5,396,614 | 3/1995 | Khalidi et al. . |
| 5,408,605 | 4/1995 | Deering . |
| 5,426,750 | 6/1995 | Becker et al. . |
| 5,440,682 | 8/1995 | Deering . |
| 5,446,854 | 8/1995 | Khalidi et al. . |
| 5,465,337 | 11/1995 | Kong . |
| 5,479,627 | 12/1995 | Khalidi et al. . |
| 5,491,806 | 2/1996 | Horstmann et al. . |
| 5,500,948 | 3/1996 | Hinton et al. . |
| 5,524,233 | 6/1996 | Milburn et al. . |
| 5,542,062 | 7/1996 | Taylor et al. . |
| 5,546,555 | 8/1996 | Horstmann et al. . |
| 5,548,739 | 8/1996 | Yung . |
| 5,553,023 | 9/1996 | Lau et al. . |
| 5,584,014 | 12/1996 | Nayfeh et al. . |
| 5,586,283 | 12/1996 | Lopez-Aguado et al. . |
| 5,664,161 | 9/1997 | Fukushima et al. ............... 345/501 |

OTHER PUBLICATIONS

Accelerated Graphics Port Interface Specification. Revision 1.0. Intel Corporation. Jul. 31, 1996. 81 pgs.

LSI Logic L64852 Mbus–to–SBus Controler (M2S) Technical Manual. LSI Logic Corporation (1993). 73 pgs.

*Primary Examiner*—Ulka J. Chauhan
*Attorney, Agent, or Firm*—Knobbe, Martens, Olson & Bear, LLP

[57] ABSTRACT

A modular architecture for storing, addressing and retrieving graphics data from main memory instead of expensive local frame buffer memory. A graphic address remapping table (GART), defined in software, is used to remap virtual addresses falling within a selected range, the GART range, to non-contiguous pages in main memory. Virtual address not within the selected range are passed without modification. The GART includes page table entries (PTEs) having translation information to remap virtual addresses falling within the GART range to their corresponding physical addresses. The GART PTEs are of configurable length enabling optimization of GART size and the use of feature bits, such as status indicators, defined by software. The GART is implemented during system boot up by configuration registers. Similarly, the PTEs are configured using mask registers. The GART may be used in conjunction with a translation lookaside buffer (TLB) to improve address remapping performance.

51 Claims, 13 Drawing Sheets

SYSTEM FOR ACCELERATED GRAPHICS PORT ADDRESS REMAPPING INTERFACE TO MAIN MEMORY

CROSS REFERENCE TO RELATED APPLICATIONS

All of the following patent applications are cross-referenced to one another, and all have been assigned to Micron Electronics, Incorporated. These applications have been concurrently filed and are hereby incorporated in this patent application by reference.

| U.S. patent application Ser. No. | Title |
|---|---|
| 08/882,054 | Apparatus for Graphic Address Remapping |
| 08 882,327 | Method for Performing Graphic Address Remapping |

BACKGROUND OF THE INVENTION

1. Field of the Invention

The present invention relates to computer systems, and more particularly, to a system for mapping virtual addresses to physical addresses in graphics applications.

2. Description of the Related Technology

As shown in FIG. 1, a conventional computer system architecture 100 includes a processor 102, system logic 104, main memory 106, a system bus 108, a graphics accelerator 110 communicating with a local frame buffer 112 and a plurality of peripherals 114. The processor 102 communicates with main memory 106 through a memory management unit (MMU) in the system logic 104. Peripherals 114 and the graphics accelerator 110 communicate with main memory 106 and system logic 104 through the system bus 108. The standard system bus 108 is currently the Peripherals Connection Interface (PCI). The original personal computer bus, the Industry Standard Architecture (ISA), is capable of a peak data transfer rate of 8 megabytes/sec and is still used for low-bandwidth peripherals, such as audio. On the other hand, PCI supports multiple peripheral components and add-in cards at a peak bandwidth of 132 megabytes/sec. Thus, PCI is capable of supporting full motion video playback at 30 frames/sec, true color high-resolution graphics and 100 megabits/sec Ethernet local area networks. However, the emergence of high-bandwidth applications, such as three dimensional (3D) graphics applications, threatens to overload the PCI bus.

For example, a 3D graphics image is formed by taking a two dimensional image and applying, or mapping, it as a surface onto a 3D object. The major kinds of maps include texture maps, which deal with colors and textures, bump maps, which deal with physical surfaces, reflection maps, refraction maps and chrome maps. Moreover, to add realism to a scene, 3D graphics accelerators often employ a z-buffer for hidden line removal and for depth queuing, wherein an intensity value is used to modify the brightness of a pixel as a function of distance. A z-buffer memory can be as large or larger than the memory needed to store two dimensional images. The graphics accelerator 110 retrieves and manipulates image data from the local frame buffer 112, which is a type of expensive high performance memory. For example, to transfer an average 3D scene (polygon overlap of three) in 16-bit color at 30 frames/sec at 75 Hz screen refresh, estimated bandwidths of 370 megabytes/sec to 840 megabytes/sec are needed for screen resolutions from 640×480 resolution (VGA) to 1024×768 resolution (XGA). Thus, rendering of 3D graphics on a display requires a large amount of bandwidth between the graphics accelerator 110 and the local frame buffer 112, where 3D texture maps and z-buffer data typically reside.

In addition, many computer systems use virtual memory systems to permit the processor 102 to address more memory than is physically present in the main memory 106. A virtual memory system allows addressing of very large amounts of memory as though all of that memory were a part of the main memory of the computer system. A virtual memory system allows this even though actual main memory may consist of some substantially lesser amount of storage space than is addressable. For example, main memory may include sixteen megabytes (16,777,216 bytes) of random access memory while a virtual memory addressing system permits the addressing of four gigabytes (4,294,967,296 bytes) of memory.

Virtual memory systems provide this capability using a memory management unit (MMU) to translate virtual memory addresses into their corresponding physical memory addresses, where the desired information actually resides. A particular physical address holding desired information may reside in main memory or in mass storage, such as a tape drive or hard disk. If the physical address of the information is in main memory, the information is readily accessed and utilized. Otherwise, the information referenced by the physical address is in mass storage and the system transfers this information (usually in a block referred to as a page) to main memory for subsequent use. This transfer may require the swapping of other information out of main memory into mass storage in order to make room for the new information. If so, the MMU controls the swapping of information to mass storage.

Pages are the usual mechanism used for addressing information in a virtual memory system. Pages are numbered, and both physical and virtual addresses often include a page number and an offset into the page. Moreover, the physical offset and the virtual offset are typically the same. In order to translate between the virtual and physical addresses, a basic virtual memory system creates a series of lookup tables, called page tables, stored in main memory. These page tables store the virtual address page numbers used by the computer. Stored with each virtual address page number is the corresponding physical address page number which must be accessed to obtain the information. Often, the page tables are so large that they are paged themselves. The page number of any virtual address presented to the memory management unit is compared to the values stored in these tables in order to find a matching virtual address page number for use in retrieving the corresponding physical address page number.

There are often several levels of tables, and the comparison uses a substantial amount of system clock time. For example, to retrieve a physical page address using lookup tables stored in main memory, the typical MMU first looks to a register for the address of a base table which stores pointers to other levels of tables. The MMU retrieves this pointer from the base table and places it in another register. The MMU then uses this pointer to go to the next level of table. This process continues until the physical page address of the information sought is recovered. When the physical address is recovered, it is combined with the offset furnished as a part of the virtual address and the processor uses the result to access the particular information desired. Completion of a typical lookup in the page tables may take from ten to fifteen clock cycles at each level of the search.

To overcome this delay, virtual management systems often include cache memories called translation look aside buffers (TLBs). A TLB is essentially a buffer for caching recently translated virtual page addresses along with their corresponding physical page addresses. Such an address cache works on the same principle as do caches holding data and instructions, the most recently used addresses are more likely to be used than are other addresses. Thus, if a subsequent virtual address refers to the same page as the last one, the page table lookup process is skipped to save time. A TLB entry is like a cache entry wherein a tag portion includes portions of the virtual address and the data portion includes a physical page frame number, protections fields, use bits and status bits. When provided with a virtual page address stored in the TLB (a translation hit), the TLB furnishes a physical page address for the information without having to consult any page lookup tables. When the processor requests a virtual page address not stored in the TLB (a translation miss), the MMU must then consult the page lookup tables. When this occurs, the physical page address recovered is stored along with the virtual page address in the TLB so that it is immediately available for subsequent use. This saves a substantial amount of time on the next use of the information. For example, accessing the information using a TLB may require only one or two clock cycles compared to the hundreds of clock cycles required for a page table lookup.

Virtual memory systems are common in the art. For example, in U.S. Pat. No. 5,446,854, Khalidi et al. disclose a method and apparatus for virtual to physical address translation using hashing. Similarly, Crawford et al. disclose a microprocessor architecture having segmentation mechanisms for translating virtual addresses to physical addresses in U.S. Pat. No. 5,321,836. Lastly, in U.S. Pat. Nos. 5,491,806 and 5,546,555, Horstmann, et al. disclose an optimized translation lookaside buffer for use in a virtual memory system.

As shown in FIG. 1, moving 3D graphics data to the main memory 106 in current computer systems would require the graphics accelerator 110 to access the 3D graphics data through the PCI system bus 108. Thus, although Bechtolsheim discloses a data bus enabling virtual memory data transfers in U.S. Pat. Nos. 4,937,734 and 5,121,487, 3D rendering exceeds the peak PCI bandwidth of 132 megabytes/sec because a bandwidth of at least 370 megabytes/sec is needed for data transfer from main memory 106. Moreover, the graphics accelerator 110 often requires storage of graphics data into large contiguous blocks of memory. For example, a 16-bit 256×256 pixel texture map for 3D graphics applications requires a memory block having a size of 128K bytes. However, operating system software, such as Microsoft® Windows®, Windows® 95 and Windows NT®, and the system logic 104 often allocate main memory in page frames having smaller sizes, such as 4K. In U.S. Pat. No. 5,465,337, Kong discloses a memory management unit capable of handling virtual address translations for multiple page sizes. However, this does not address the bandwidth limitations of the PCI bus discussed above. In order to move 3D graphics data from the local frame buffer 112 to main memory 106, computer systems require an improved method for storing and addressing graphics data in main memory.

In U.S. Pat. No. 5,313,577, Meinerth et al. discloses a graphics processor capable of reading from, and writing to, virtual memory. This graphics processor can be described by reference to FIG. 2, which illustrates a graphics/memory control unit 120 including a graphics processor unit 122 that communicates with a memory control unit 124. The graphics/memory control unit 120 in turn communicates with the main memory 106 and the frame buffer 112 through a dedicated memory bus 126. The graphics processor unit 122 includes an address generator and a virtual translation unit to provide for translation of virtual addresses to physical addresses when accessing the main memory 106 and the frame buffer 112. In addition, the memory control unit 124 communicates with a processor 102 through a dedicated system bus 128, with an I/O device 114 through a dedicated I/O bus 130 and with computer networks through a dedicated network bus 132. In contrast to the structure of FIG. 1, the use of dedicated buses for communication with the main memory 106, I/O devices 114 and computer networks substantially increases system cost and decreases the flexibility with which a computer system can be upgraded. For example, to upgrade the graphics capability of a computer system having the structure as illustrated in FIG. 1, one simply connects a more powerful graphics adapter to the PCI bus 108 (FIG. 1). However, upgrading the graphics capability of a computer system having the structure of FIG. 2 requires replacement of the memory control unit 124 as well as the graphics processor unit 122. Similarly, the structure of FIG. 2 is not compatible with the vast majority of available PCI enhancement devices. Moreover, the structure of FIG. 2 also requires the graphics processor unit 122 to access 3D graphics data through a memory bus 126.

In view of the limitations discussed above, computer manufacturers require a modular architecture that reduces the cost of system upgrades, such as enhanced 3D graphics adapters, to improve display performance. Similarly, to reduce system memory costs, computer manufacturers require improved methods for storing, addressing and retrieving graphics data from main memory instead of expensive local frame buffer memory. Moreover, to address the needs of high bandwidth graphics applications without substantial increases in system cost, computer manufacturers require improved technology to overcome current system bus bandwidth limitations.

SUMMARY OF THE INVENTION

One embodiment of the present invention includes a computer system comprising a processor, a memory in communication with the processor, a graphics processor configured to access the memory using a virtual address, a graphics port in communication with the memory and the graphics processor and a graphics address remapping table (GART) configured for access by the graphics processor and including information which is used to translate the virtual address to a physical address corresponding to a location in the memory.

Another embodiment of the present invention includes a computer system comprising a processor, a memory in communication with the processor, a graphics processor configured to access the memory using a virtual address, a graphics port in communication with the memory and the graphics processor and a translation lookaside buffer (TLB) receiving a portion of the virtual address, the TLB having at least one TLB entry, wherein each of the at least one TLB entries includes a virtual page field and a corresponding physical page field, wherein if the portion of the virtual address matches the virtual page field of one TLB entry, the TLB provides translation information from the physical page field of the one TLB entry to form a physical address.

Yet another embodiment of the present invention includes a computer system comprising a processor, a memory in communication with the processor, a graphics processor configured to access the memory using a virtual address, a graphics port in communication with the memory and the graphics processor, a graphics address remapping table (GART) configured for access by the graphics processor and including information which is used to translate the virtual address to a physical address and a translation lookaside buffer (TLB) receiving a portion of the virtual address, the TLB having at least one TLB entry, wherein each of the at least one TLB entries includes a virtual page field and a corresponding physical page field, wherein if the portion of the virtual address matches the virtual page field of one TLB entry, the TLB provides translation information from the physical page field of the one TLB entry to form the physical address and wherein if the portion of the virtual address does not match the virtual page field of one TLB entry, the GART provides translation information referenced by the portion of the virtual address to form the physical address.

Lastly, yet another embodiment of the present invention includes a computer system comprising a processor, a memory in communication with the processor, a graphics processor configured to access the memory using a virtual address, a graphics port in communication with the memory and the graphics processor, an interface receiving a portion of the virtual address and a translation lookaside buffer (TLB) in communication with the interface, the TLB having at least one TLB entry including information which is used to translate the virtual address to a physical address, wherein the interface provides access to a TLB entry corresponding to the portion of the virtual address.

DETAILED DESCRIPTION OF THE INVENTION

Figure 1:
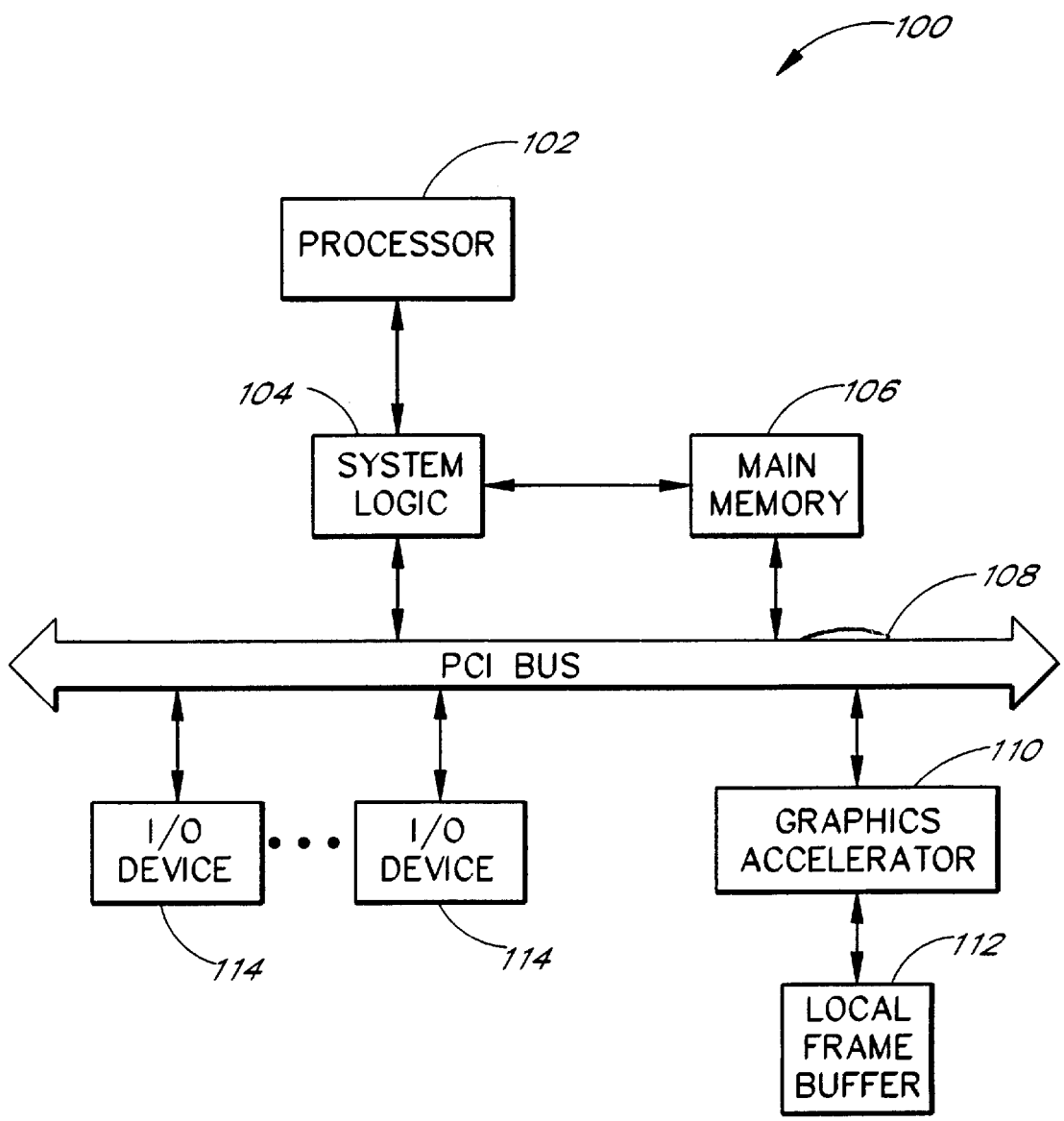
FIG. 1 is a block diagram illustrating the architecture of a prior art computer system.
Figure 2:
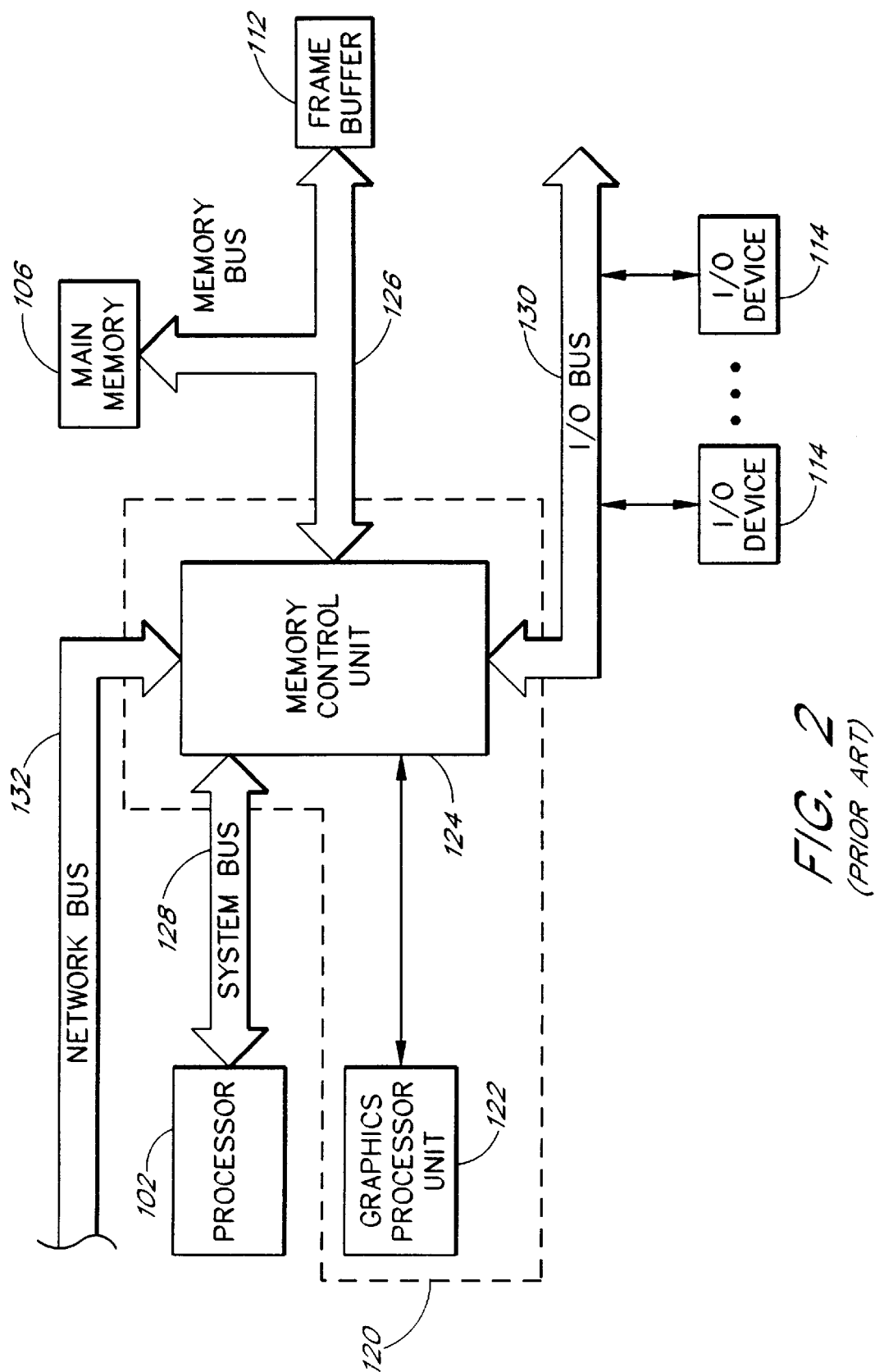
FIG. 2 is a block diagram illustrating the architecture of another prior art computer system.

In contrast to the conventional computer system architecture 100 (FIG. 1), embodiments of the present invention enable relocation of a portion of the 3D graphics data, such as the texture data, from the local frame buffer 112 (FIG. 1) to main memory 106 (FIG. 1) to reduce the size, and thus the cost, of the local frame buffer 112 and to improve system performance. For example, as texture data is generally read only, moving it to main memory 106 does not cause coherency or data consistency problems. Similarly, as texture data is loaded from mass storage into main memory 106, leaving it in main memory 106 instead of copying it to the local frame buffer 112 reduces overhead. Moreover, as the complexity and quality of 3D images has increased, leaving 3D graphics data in the local frame buffer 112 has served to increase the computer system cost over time. Thus, although moving 3D graphics data to main memory 106 may likewise require an increase in the size of the main memory 106, the architecture of the present invention reduces the total system cost because it is less expensive to increase main memory 106 than to increase local frame buffer memory 112.

Figure 3:
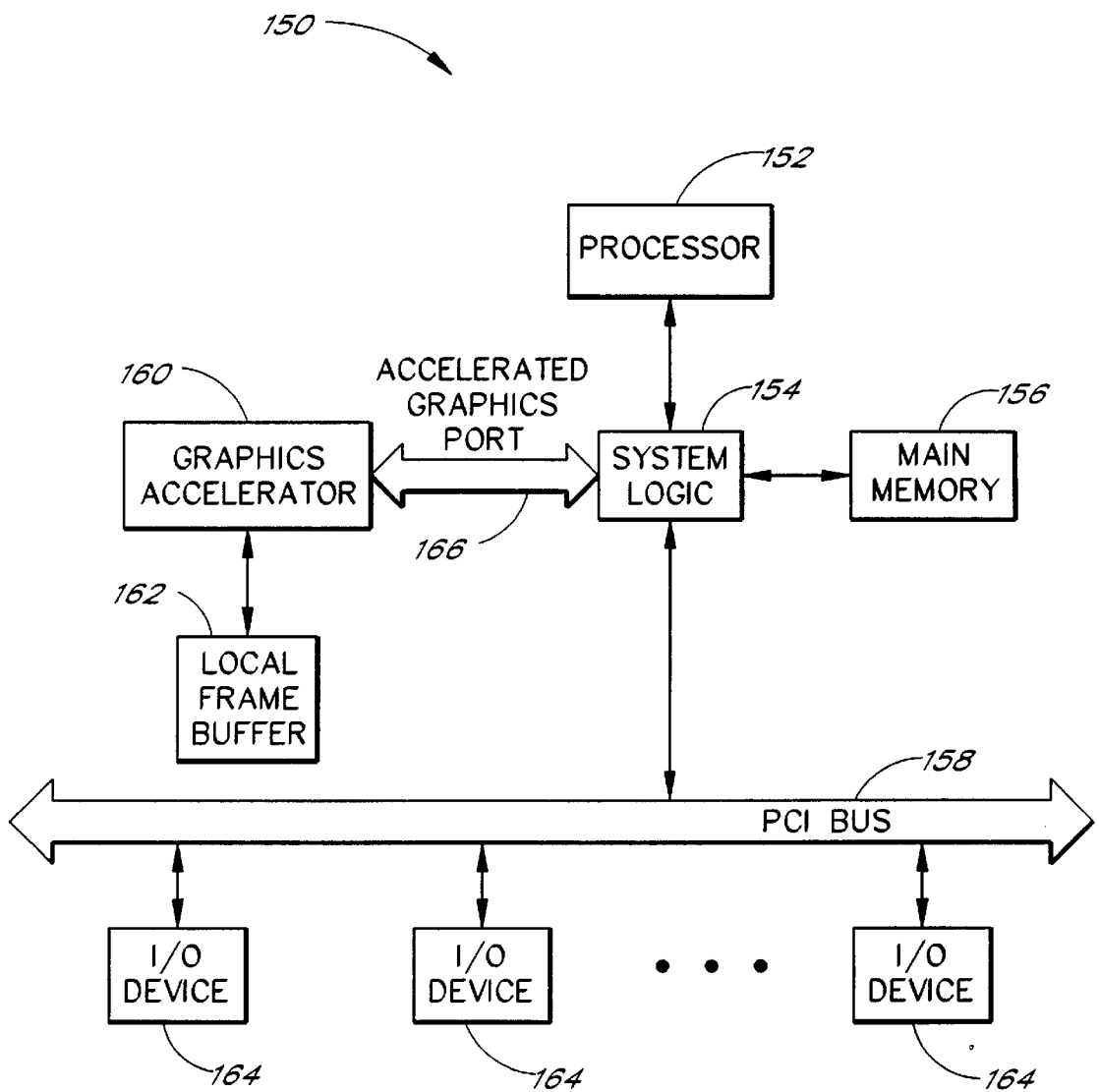
FIG. 3 is a block diagram illustrating the architecture of a computer system of one embodiment of the present invention.

Referring now to FIG. 3, the computer system architecture 150 of one embodiment of the present invention includes a processor 152, system logic 154, main memory 156, a system bus 158, a graphics accelerator 160 communicating with a local frame buffer 162 and a plurality of peripherals 164. The processor 152 communicates with the main memory 156 through a memory management unit (MMU) in the system logic 154. Peripherals 114 communicate with the main memory 156 and system logic 154 through the system bus 158. Note however that the graphics accelerator 160 communicates with the system logic 154 and main memory 156 through an accelerated graphics port (AGP) 166. AGP 166 is not a bus, but a point-to-point connection between an AGP compliant target, the MMU portion of the system logic 154, and an AGP-compliant master, the graphics accelerator 160. The AGP 166 point-to-point connection enables data transfer on both the rising and falling clock edges, improves data integrity, simplifies AGP protocols and eliminates bus arbitration overhead. AGP provides a protocol enhancement enabling pipelining for read and write accesses to main memory 156.

For example, the graphics accelerator 160 initiates a pipelined transaction with an access request. System logic 154 responds to the request by initiating the corresponding data transfer at a later time. The graphics accelerator 160 can then issue its next pipelined transaction while waiting for the previous data to return. This overlap results in several read or write requests being active at any point in time. In one embodiment, the AGP 166 operates with a 66 MHz clock using 3.3 volt signaling. As data transfers can occur on both clock edges, the AGP 166 enables an effective 133 MHz data transfer rate and can reach a peak bandwidth of 533 megabytes/sec. For detailed information on the AGP 166, consult the *Accelerated Graphics Port Interface Specification, Revision* 1.0, released by Intel Corporation and available from Intel in Adobe® Acrobat® format on the World Wide Web at the URL: developer.intel.com/pc-supp/platform/agfxport/agp10.pdf. This document is hereby incorporated by reference.

As noted above, the embodiment of FIG. 3 enables the graphics accelerator 160 to access both main memory 156 and the local frame buffer 162. From the perspective of the graphics accelerator 160, the main memory 156 and the local frame buffer 162 are logically equivalent. Thus, to optimize system performance, graphics data may be stored in either the main memory 156 or the local frame buffer 162. In contrast to the direct memory access (DMA) model where graphics data is copied from the main memory 156 into the local frame buffer 162 by a long sequential block transfer prior to use, the graphics accelerator 160 of the present invention can also use, or "execute," graphics data directly from the memory in which it resides (the "execute" model). However, since the main memory 156 is dynamically allocated in random pages of a selected size, such as 4K, the "execute" model requires an address mapping mechanism to map random pages into a single contiguous, physical address space needed by the graphics accelerator 160.

Figure 4:
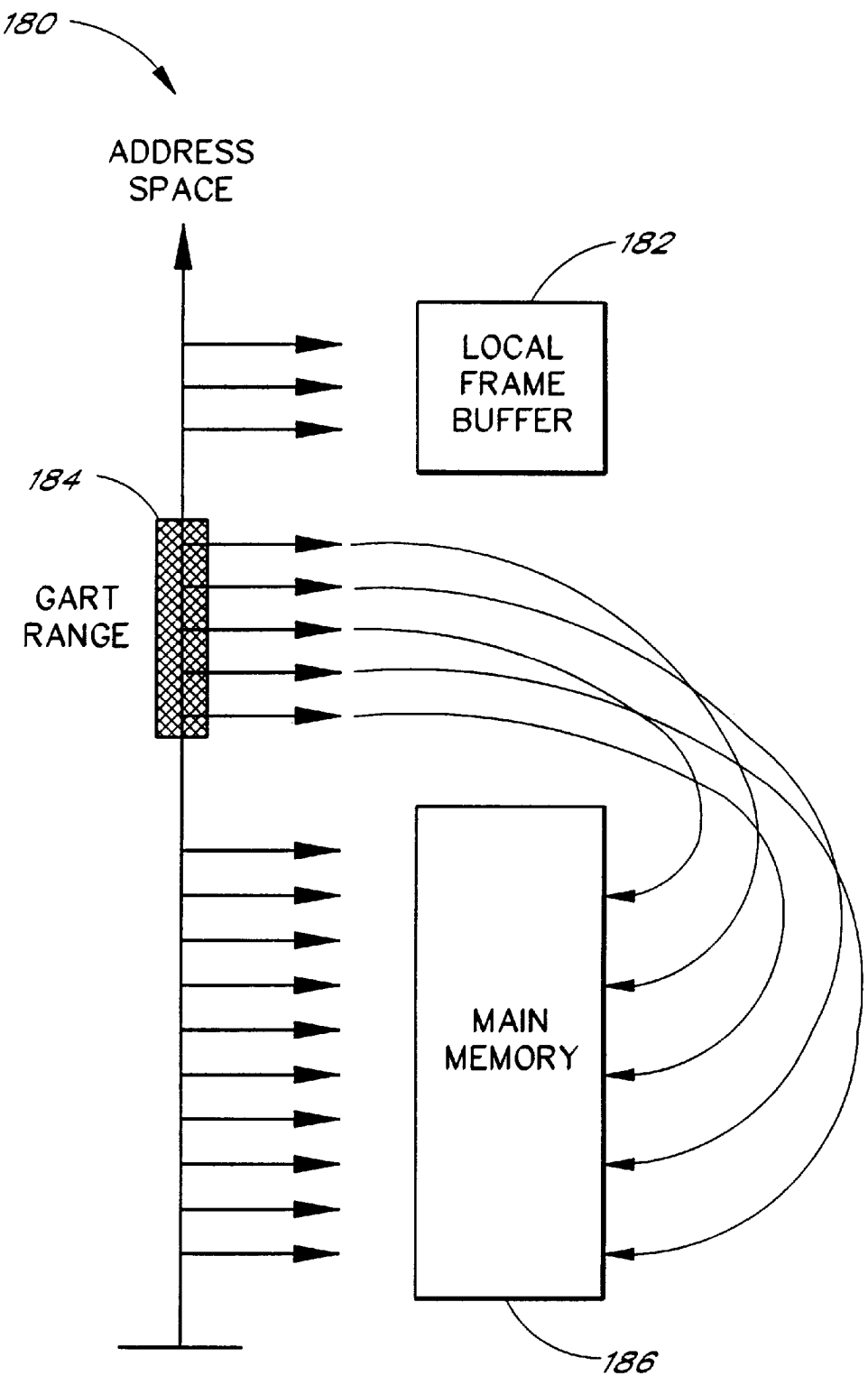
FIG. 4 is a diagram illustrating the address space of a processor of one embodiment of the present invention.

FIG. 4 illustrates an embodiment of the address space 180 of the computer system 150 (FIG. 3) of the present invention. For example, a 32 bit processor 152 (FIG. 3) has an address space 180 including $2^{32}$ (or 4,294,967,296) different addresses. A computer system 150 (FIG. 3) typically uses different ranges of the address space 180 for different devices and system agents. In one embodiment, the address space 180 includes a local frame buffer range 182, a graphics address remapping table (GART) range 184 and a main memory range 186. In contrast to prior art systems, addresses falling within the GART range 184 are remapped to non-contiguous pages within the main memory range 186. All addresses not in the GART range 184 are passed through without modification so that they map directly to the main memory range 186 or to device specific ranges, such as the local frame buffer range 182. In one embodiment, the system logic 154 performs the address remapping using a memory based table, the GART, defined in software with an application program interface (API). Moreover, the GART table format is abstracted to the API by a hardware abstraction layer (HAL) or a miniport driver provided by the system logic 154. Thus, by defining the GART in software, the present invention advantageously provides the substantial implementation flexibility needed to address future partitioning and remapping circuitry (hardware) as well as any current or future compatibility issues.

Figure 5A:
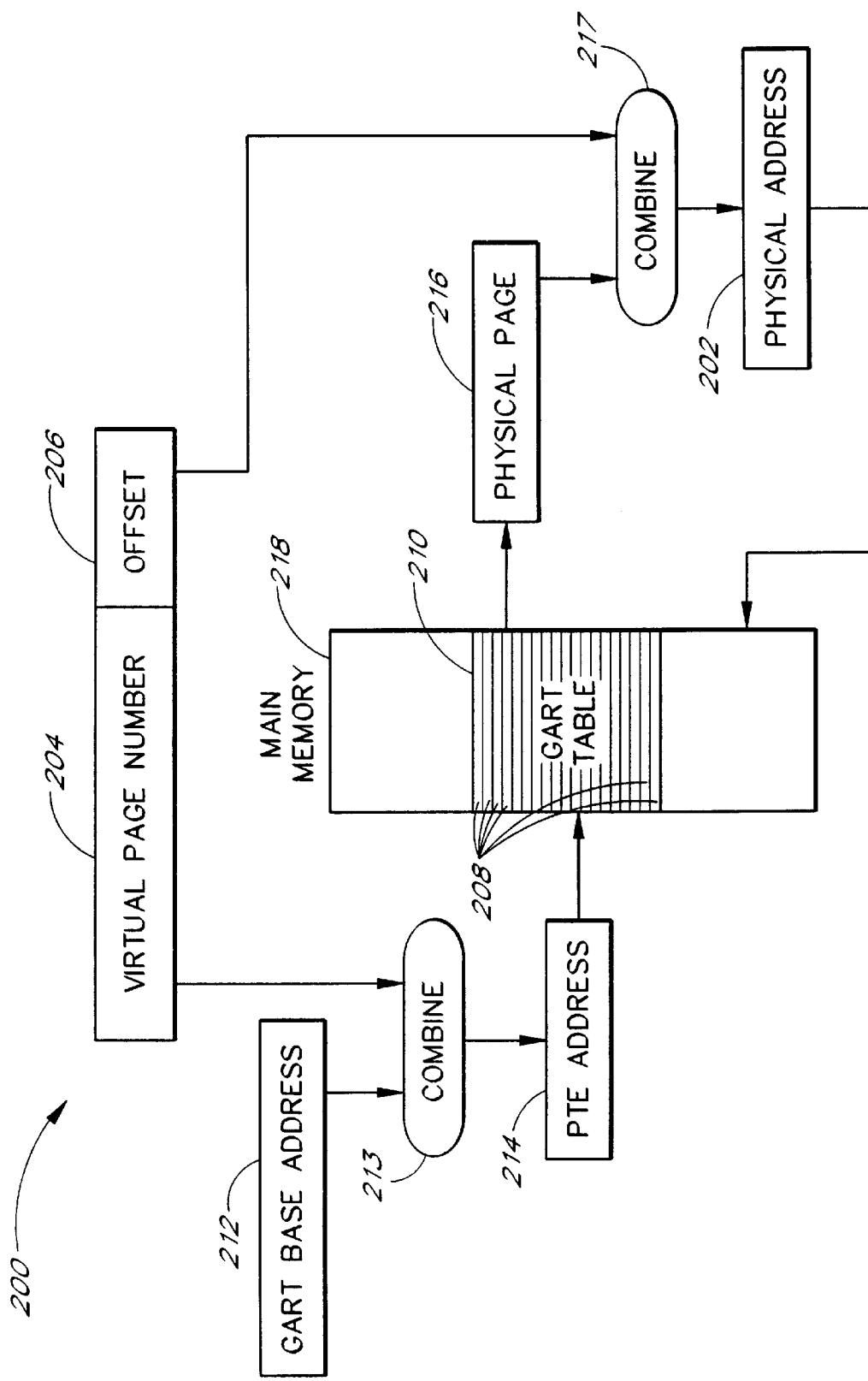
FIG. 5a is a diagram illustrating the translation of a virtual address to a physical address of one embodiment of the present invention.

FIG. 5a illustrates the translation of a virtual address 200 to a physical address 202 in one embodiment of the present invention. As discussed previously, in one embodiment, only those virtual addresses falling within the GART range 184 (FIG. 4) are remapped to main memory 186 (FIG. 4). A virtual address 200 includes a virtual page number field 204 and an offset field 206. Translation of the contents of the virtual page number field 204 occurs by finding a page table entry (PTE) corresponding to the virtual page number field 204 among the plurality of GART PTEs 208 in the GART table 210. To identify the appropriate PTE having the physical address translation, the GART base address 212 is combined at 213 with the contents of the virtual page number field 204 to obtain a PTE address 214. The contents referenced by the PTE address 214 provide the physical page number 216 corresponding to the virtual page number 204. The physical page number 216 is then combined at 217 with the contents of the offset field 206 to form the physical address 202. The physical address 202 in turn references a location in main memory 218 having the desired information.

The GART table 210 may include a plurality of PTEs 208 having a size corresponding to the memory page size used by the processor 152 (FIG. 3). For example, an Intel® Pentium® or Pentium® Pro processor operates on memory pages having a size of 4K. Thus, a GART table 210 adapted for use with these processors may include PTEs referencing 4K pages. In one embodiment, the virtual page number field 204 comprises the upper 20 bits and the offset field 206 comprises the lower 12 bits of a 32 bit virtual address 200. Thus, each page includes $2^{12}$=4096 (4K) addresses and the lower 12 bits of the offset field 206 locate the desired information within a page referenced by the upper 20 bits of the virtual page number field 204. The GART table 210 preferably resides in the main memory 218. Memory refers generally to storage devices, such as registers, SRAM, DRAM, flash memory, magnetic storage devices, optical storage devices and other forms of volatile and non-volatile storage.

Figure 5B:
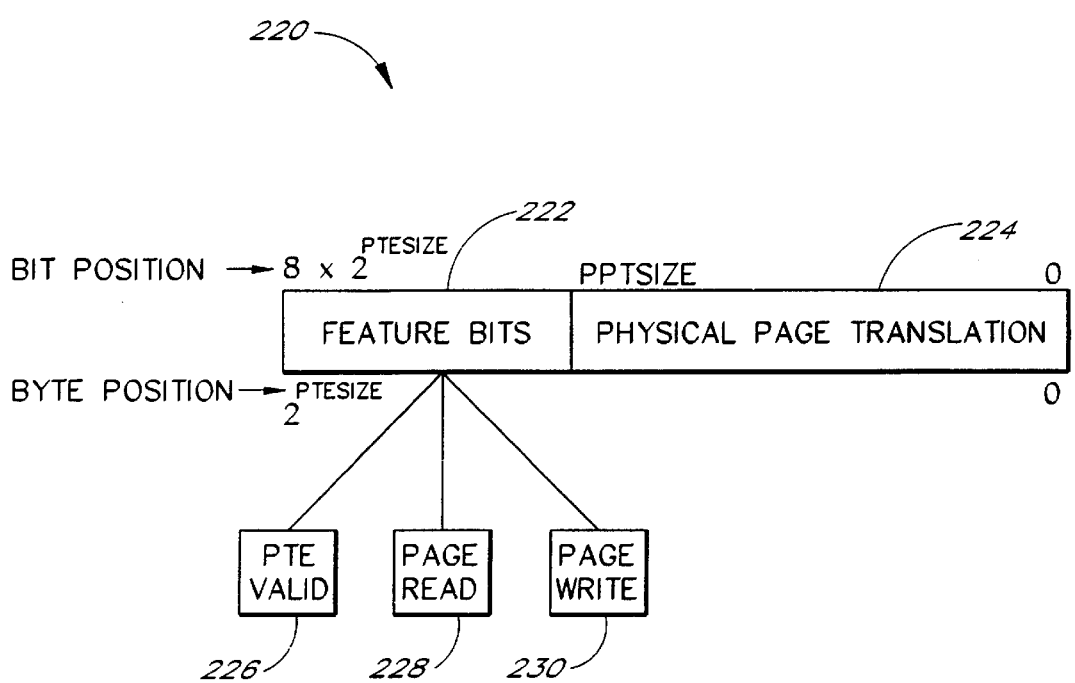
FIG. 5b is a diagram illustrating a page table entry (PTE) of the graphic address remapping table (GART) of one embodiment of the present invention.

FIG. 5b illustrates one possible format for a GART PTE 220. The GART PTE 220 includes a feature bits field 222 and a physical page translation (PPT) field 224. In contrast to prior art systems where hardwired circuitry defines a page table format, the GART table 210 (FIG. 5a) may include PTEs of configurable length enabling optimization of table size and the use of feature bits defined by software. The length of the GART PTE 220 is $2^{PTESize}$ bytes or $8*2^{PTESize}$ bits. For example, for a PTESize=5, the GART PTE has a length of 32 bytes or 256 bits. The PPT field 224 includes PPTSize bits to generate a physical address 202 (FIG. 5a). PPTSize defines the number of translatable addresses, and hence the GART table 210 (FIG. 5a) includes $2^{PTPSize}$ PTE entries. As PTESize defines the size of each GART PTE 220, the memory space needed for the entire GART table 210 (FIG. 5a) is $2^{(PTESize+PPTSize)}$ bytes. For example, the GART table 210 in a system with a 4K ($=2^{12}$) memory page size and 32 megabytes ($=2^{25}$) of main memory 218 (FIG. 5a) includes $2^{25}/2^{12}=2^{13}$=8192 PTEs. Thus, only 13 bits are needed to define 8192 unique PTEs to span the entire 32 megabytes of main memory 218 (FIG. 5a) and PPTSize=13. However, to accommodate various software feature bits, each PTE may have a size of 8 bytes ($=2^3$ and PTESize=3). Thus, the size of the GART table 210 is $2^{(PTESize+PTPSize)}= 2^{(3+13)}=2^{16}$=65536 bytes=64K.

As noted above, the GART table 210 (FIG. 5a) may use 4K page boundaries. Thus, when (PTESize+PPTSize) is less than 12 bits ($2^{12}$=4096 bytes=4K), the entire GART table 210 (FIG. 5a) resides within one 4K page. For values greater than 12, the GART table 210 (FIG. 5a) resides on multiple 4K pages. To maintain compatibility with the Intel® Pentium® Pro processor caches, the GART base address 214 (FIG. 5a) may begin on a $2^{(PTESize+PTPSize)}$ byte boundary. Thus, a GART base address 214 (FIG. 5a) can not have a value which aligns the GART table 210 (FIG. 5a) on an address boundary less than the size of the GART table 210 (FIG. 5a). For example, an 8K GART table 210 (FIG. 5a) must begin on a 8K boundary.

In one embodiment, an initialization BIOS implements the GART table 210 (FIG. 5a) by loading configuration registers in the system logic 154 (FIG. 3) during system boot up. In another embodiment, the operating system implements the GART table 210 (FIG. 5a) using an API to load the configuration registers in the system logic 154 (FIG. 3) during system boot up. The operating system then determines the physical location of the GART table 210 (FIG. 5a) within main memory 218 (FIG. 5a) by selecting the proper page boundary as described above (i.e., an 8K GART table begins on an 8K boundary). For example, the system loads configuration registers holding the GART base address 214 (FIG. 5a) defining the beginning of the GART table 210 (FIG. 5a), PTESize defining the size of a GART PTE 220 and PPTSize defining the size of the physical address used to translate a virtual address. In addition, the system loads a configuration register for AGPAperture, defining the lowest address of the GART range 184 (FIG. 4), and PhysBase, defining the remaining bits needed to translate a virtual address not included in the PPTSize bits.

For example, consider a system having 64 megabytes of main memory 218 (FIG. 5a) encompassing physical addresses 0 through 0x03FFFFFF with the AGP related data occupying the upper 32 megabytes of main memory 218 referenced by physical addresses 0x02000000 through 0x03FFFFFF. If the GART Range 184 (FIG. 4) begins at the 256 megabyte virtual address boundary 0x10000000, the invention enables translation of virtual addresses within the GART Range 184 to physical addresses in the upper 32 megabytes of main memory 218 corresponding to physical addresses in the range 0x02000000 through 0x03FFFFFF. As noted earlier, a GART table 210 includes multiple PTEs, each having physical page translation information 224 and software feature bits 222. The GART table 210 may be located at any physical address in the main memory 218, such as the 2 megabyte physical address 0x00200000. For a system having a 4K memory page size and a GART PTE 220 of 8 byte length, the GART table 210 is configured as follows:

| | | |
|---|---|---|
| PhysBase | := 0x02000000 | -- Start of remapped physical address |
| PhysSize | := 32 megabytes | -- Size of remapped physical addresses |
| AGPAperture | := 0x10000000 | -- Start address of GART Range |
| GARTBase | := 0x00200000 | -- Start address of GART table |
| $2^{PTESize}$ | := 8 bytes | -- Size of each GART Page Table Entry |
| PageSize | := 4 kilobytes | -- Memory page size |

To determine the number of PTEs in the GART table 210, the size of the physical address space in main memory 218 allocated to AGP related data, the upper 32 megabytes= 33554432 bytes, is divided by the memory page size, 4K=4096 bytes, to obtain 8192 PTEs. Note that $8192=2^{13}=2^{PTESize}$ and thus, PTESize=13. To implement the GART table 210, the configuration registers are programmed with the following values:

| | | |
|---|---|---|
| PhysBase | := 0x02000000 | -- Start of remapped physical address |
| AGPAperture | := 0x10000000 | -- Start address of GART Range |
| GARTBase | := 0x00200000 | -- Start address of GART table |
| PTESize | := 3 | -- Size of each GART PTE |
| PPTSize | := 13 | -- Number of PPT bits in each PTE |

Lastly, the GART table 210 is initialized for subsequent use.

Using pseudo-VHDL code, system logic 154 (FIG. 3) can quickly determine whether a 32 bit AGP address (AGPAddr) requires translation from a virtual to physical address (PhysAddr) as follows:

if ((AGPAddr(31 downto 12) and not ($2^{PPTSize}$ − 1))=AGPAperture (31 downto 12))
then
    Virtual=true;
else
    Virtual=false;
end if;

When the address is virtual, then the PTE address 214 (PTEAddr) is calculated as follows:

PTEAddr<=((AGPAddr(31 downto 12) and ($2^{(PPTSize)}$-1))
    shl$2^{PTESize}$) or (GARTBase and not($2^{(PTESize+PPTSize)}$-1)));

Note that the "shl" function indicates a left shift with zero fill, which can be implemented in hardware using a multiplexer. Lastly, to determine the physical address 202 (PhysAddr) when PPTSize does not include sufficient bits to remap the entire GART range 184 (FIG. 4), the physical page 216 is generated as follows:

PhysAddr(31 downto 12)<=(PhysBase(31 downto 12) and not ($2^{PPTSize}$-1)) or (PTE and ($2^{PPTSize}$-1)));

To obtain the physical address 202, the physical page 216, PhysAddr(31 downto 12), is then combined with the offset 206. Note that the pseudo-code above avoids the use of adders, which impede system performance at high clock frequencies, in the virtual to physical address translation process.

To illustrate the use of the pseudo-code above, suppose an AGP master, such as the graphics accelerator 160 (FIG. 3), presents the virtual address 0x10002030, which corresponds to AGPAddr in the pseudo-code, to the system logic 154 (FIG. 3) for translation. To determine if AGPAddr=0x 10002030 is appropriate for translation using the GART table configured above, the system logic 154 first evaluates the if condition:

((AGPAddr(31 downto 12) and not ($2^{PPTSise}$-1))=AGPAperture (31 downto 12))

to determine if it is true or false. In addition, the expression ($2^{PPTSize}$-1) indicates that the lower PPTSize bits are set, which is easily performed in hardware. For the GART table 210 configured above, note that PPTSize=13, ($2^{PPTSize}$-1)= 0x01FFF (hexadecimal) and AGPAperture=0x10000000. The notation (31 downto 12) indicates use of bit positions 12 through 31 of an address, which is equivalent to truncating the lower 12 bits of a binary address or the lower three values of a hexadecimal address. Thus, for AGPAddr=0x 10002030 and AGPAperture=0x10000000, AGPAddr(31 downto 12)=0x10002 and AGPAperture(31 downto 12)=0x 10000. Now, substitute the values for AGPAddr, AGPAperture and ($2^{PPTSize}$-1) into the if condition:

((AGPAddr(31 downto 12) and not ($2^{PPTSize}$-1))=AGPAperture (31 downto 12))

or (0x10002 and not (0x01FFF))=0x10000 or

0x10000=0x10000 to calculate a result. Here, the result is true indicating that AGPAddr=0x10002030 is a valid address for translation. Similarly, for the virtual address 0x10002030, the if condition produces this result: 0x11000=0x10000. As 0x11000≠0x10000, this result is false indicating that the virtual address 0x11002030 does not fall within the GART range 184. If an AGP master presented the virtual address 0x11002030, the system logic 154 reports an error.

To determine the location of the PTE in the GART table 210 having the translation information for the virtual address AGPAddr=0x10002030, the expression:

PTEAddr<=((AGPAddr(31 downto 12) and ($2^{(PPTSize)}$-1)) shl $2^{PTESize}$) or (GARTBase and not ($2^{(PTESize+PPTSize)}$-1)))

is evaluated. For the GART table 210 configured above, GARTBase=0x00200000, PPTSize=13, PTESize=3 and ($2^{(PTEsize+PPTSize)}$-1)=0x0FFFF. As noted above, ($2^{PPTSize}$-

1)=0x01FFF and AGPAddr(31 downto 12)=0x10002. Now, substitute the values into the equation for PTEAddress:

PTEAddr<=((0x10002 and 0x01FFF) shl 3) or (0x00200000 and not (0x0FFFF))

or

PTEAddr<=(0x00002 shl 3) or (0x00200000)

or

PTEAddr<=(0x00000010) or (0x000200000)=0x00200010.

As each PTE occupies 8 bytes and the GART table 210 begins at the GARTBase address=0x00200000, the calculated PTEAddress=0x00200010 corresponds to the third entry or PTE(2), 16 bytes away from the GARTBase address. Suppose that the lower 32 bits (or 4 bytes) of the value at PTE(2)=0x12345678. As shown in the embodiment of FIG. 5b, the lower PPTSize=13 bits correspond to the PPT translation bits and the higher order bits are software feature bits 222. Of course, in another embodiment, the PPT translation information may comprise the higher order bits while the software feature bits 222 may comprise the lower order bits. Moreover, the PPT translation information and the software feature bits 222 may be located at any of the bit positions within a PTE 220.

Lastly, to calculate the physical address corresponding to the virtual address AGPAddr=0x10002030, the expression:

PhysAddr(31 downto 12)<=(PhysBase(31 downto 12) and not ($2^{PPTSize}-1$)) or (PTE and ($2^{PPTSize}-1$)))

is evaluated. For the GART table 210 configured above, PhysBase=0x02000000 and ($2^{PPTSize}-1$)=0–01FFF. Note also that PTE(2)=0x12345678. Now, substitute the values into the equation for PhysAddr(31 downto 12):

PhysAddr(31 downto 12)<=(0x02000 and not (0x01FFF)) or (0x12345678 and 0x01FFF))

or

PhysAddr(31 downto 12)<=(0x02000) or (0x00001678)=0x03678.

Note that the offset 206 corresponds to the lower 12 bits of the virtual address 0x10002030 or AGPAddr(11 downto 0)=030. Thus, to obtain the physical address 206, the physical page 216 is combined with the offset 206 to form PhysAddr(31 downto 0) or 0x03678030. To summarize, the pseudo-code of the embodiment described above illustrates the translation of the virtual address 0x10002030 to the physical address 0x03678030.

Moreover, the feature bits field 222 provides status information for use in virtual to physical address translations. In contrast to prior art systems, the feature bits of one embodiment of the present invention provide substantial design flexibility by enabling software to change the format of the GART table 210 (FIG. 5a) without the need for a costly redesign of the hardwired circuitry. For example, during an address translation, the system may need to verify that the physical address corresponding to the virtual address still includes valid data. Similarly, the system may need to determine if a referenced physical address has been read or written to. The contents of the feature bits field 222 provide this functionality. In one embodiment, the feature bits field 222 includes indicators for PTE valid 226, page read 228 and page write 230. These indicators 226, 228, 230 may be located anywhere within the feature bits field 222 and may be implemented using at least one bit. To implement an indicator, such as PTE valid 226, the present invention uses a mask register loaded during system boot up. Thus, for PTE valid 226, the ValidMask register is used to select the bit(s) to set in the feature bits field 222 to indicate a valid PTE. Similarly, for page read 228, the ReadMask register is used to select the bit(s) to set when a translated address has been read. Furthermore, for a page write 230, the WriteMask register is used to select the bit(s) to set when a translated address has been written to. For example, if ValidMask is zero, then no PTE Valid 226 indicator is defined. Otherwise, a PTE Valid 226 mask is defined and can be applied to a GART PTE 220 to determine if the physical address translation is valid. The following VHDL pseudo-code implements this logic:

```
if((ValidMask=0) or ((ValidMask and PTE)=ValidMask)) then
    PTEValid:=true;
else
    PTEValid:=false;
end if;
```

Similarly, to implement the page read 228 and page write 230 indicators, a logical OR operation is performed on the GART PTE 220 using the WriteMask during write operations and with the ReadMask during read operations. The resulting GART PTE 220 is then written to memory 218 (FIG. 5a) to provide the page read 228 or page write 230 status information. In a similar fashion, if the WriteMask or ReadMask is zero, then no page write 230 or page read 228 indicator is defined and the GART PTE 220 is not written to memory. The following VHDL pseudo-code implements the page write 230 and page read 228 indicators:

```
if ((WriteMask ≠ 0) and ((PTE and WriteMask)≠WriteMask)) then
    PTE:=PTh or WriteMask;
    UpdatePTE:=true;
else
    PTE:=PTE;
    UpdatePTE:=false;
end if;

if ((ReadMask ≠ 0) and ((PTE and ReadMask) ≠ ReadMask)) then
    PTE:=PTE or ReadMask;
    UpdatepTE:=true;
else
    PTE:=PTE;
    UpdatePTE:=false;
end if;
```

As discussed previously, the indicators 226, 228, 230 may be implemented by programming a mask register during system boot up. In one embodiment, the initialization BIOS programs the mask register. In another embodiment, an operating system API programs the mask register during system boot up.

For example, suppose the following mask registers:

| | | |
|---|---|---|
| ValidMask | := 0x00100000 | -- Position of Valid indicator in PTE |
| WriteMask | := 0x00200000 | -- Position of Write indicator in PTE |
| ReadMask | := 0x00400000 | -- Position of Read indicator in PTE | are programmed during system boot up. To determine if the contents of a PTE 220 are valid, the if condition:

((ValidMask=0) or ((ValidMask and PTE)=ValidMask))

is evaluated to determine if it is true or false. Referring back to the previous example, note that PTE(2)=0x12345678. Now, substitute the values of PTE(2) and ValidMask into the if condition:

((ValidMask=0) or ((ValidMask and PTE)=ValidMask))

or ((0x00100000=0) or ((0x00100000 and
0x12345678)=0x00100000))

or ((0x00100000=0) or (0x00100000=0x00100000))

to calculate a result. Here, the result is true indicating that the PTE is valid. Similarly, for a ValidMask set to 0x01000000, evaluation of the if condition proceeds as follows:

((ValidMask=0) or ((ValidMask and PTE)=ValidMask))

or ((0x01000000=0) or ((0x01000000 and
0x012345678)=0x01000000))

or ((0x0100000=0) or (0x00000000=0x01000000))

to produce a false result as both (0x0100000≠0) and (0x00000000≠0x01000000), indicating an error reporting and recovery procedure is needed. Moreover, for a ValidMask set to 0x00000000 (i.e., valid bit disabled), the if condition always evaluates to true indicating that no errors are present.

In a similar fashion, for a write transaction, the if condition:

((WriteMask≠0) and ((PTE and WriteMask)≠WriteMask))

is evaluated. Note that the expression (WriteMask≠0) indicates that the write mask is enabled and the expression ((PTE and WriteMask)≠WriteMask)) determines if the write bit of PTE(2) has already been set. Now, for PTE(2)=0x12345678 and WriteMask=0x00200000, substitute these values into the if condition:

((WriteMask≠0) and ((PTE and WriteMask)≠WriteMask))

or ((0x00200000≠0) and ((0≠12345678 and
0x00200000)≠0x00200000))

or ((0x00200000≠0) and (0x00200000≠0x00200000))

to produce a false result as 0x00200000=0x00200000. Thus, the write bit does not need to be set. However, if PTE(2)= 0x12145678, the if condition evaluates as follows:

((WriteMask≠0) and ((PTE and WriteMask)≠WriteMask))

or ((0x00200000≠0) and ((0x12145678 and
0x00200000)≠0x00200000))

or ((0x00200000≠0) and (0x00000000≠0x00200000))

to produce a true result as 0x00000000≠0x00200000. Here, the write bit for PTE(2) is set as the if condition indicates that a write has not occured on this page before and the contents of PTE(2) are calculated as follows:

PTE:=PTE or WriteMask;

or

PTE(2):=0x12145678 or 0x00200000 or

PTE(2):=0x12345678 and PTE(2)=0x12345678 is written back to memory.

Lastly, for a read transaction, the if condition:

((ReadMask≠0) and ((PTE and ReadMask)≠ReadMask))

is evaluated. This pseudo-code operates in a substantially similar manner to the pseudo-code discussed above for the WriteMask. Note that the expression (ReadMask≠0) indicates that the read mask is enabled and the expression ((PTE and ReadMask)≠ReadMask)) determines if the read bit of PTE(2) has already been set. Now, for PTE(2)=0x12345678 and ReadMask=0x00400000, substitute these values into the if condition:

((ReadMask≠0) and ((PTE and ReadMask)≠ReadMask))

or ((0x00400000≠0) and ((0x12345678 and
0x00400000)≠0x00400000))

or ((0x00400000≠0) and (0x00000000≠0x00400000))

to produce a true result as 0x00000000=0x00400000. Thus, PTE(2) has not been read before and the value of PTE(2) is calculated as follows:

PTE:=PTE or ReadMask;

or

PTE(2):=0x12345678 or 0x00400000 or

PTE(2):=0x12745678 and PTE(2)=0x12745678 is written back to memory.

Figure 6A:
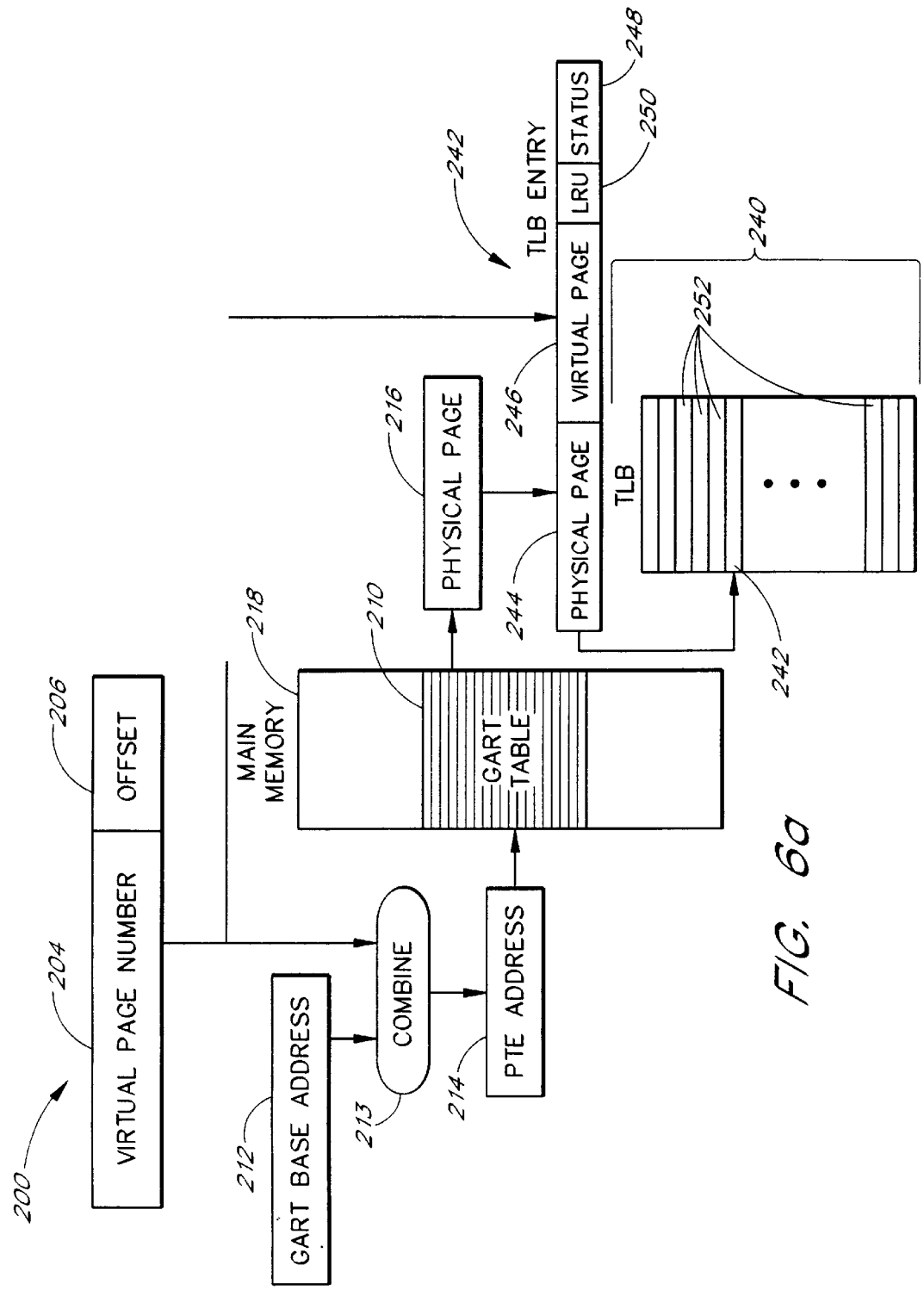
FIG. 6a is a diagram illustrating the generation of a translation look aside buffer (TLB) entry of one embodiment of the present invention.

FIG. 6a illustrates the translation of a virtual address 200 to a physical address 202 (FIG. 5a) using a translation look aside buffer (TLB) 240. As before, a virtual address 200 includes a virtual page number field 204 and an offset field 206. Translation of the virtual page number field 204 occurs by finding a PTE of the GART table 210 corresponding to the contents of the virtual page number field 204. To identify the PTE, the GART base address 212 is combined at 213 with the contents of the virtual page number field 204 to obtain a PTE address 214. The PTE address 214 in turn provides the physical page number 216 corresponding to the virtual page number 204. However, at this point, a TLB entry 242 is formed having a virtual page field 244, its corresponding physical page field 246, a least recently used (LRU) counter 248 to determine the relative age of the TLB entry 242 and a status indicator 250 to determine when the TLB 240 has valid information. The TLB entry 242 is stored in a TLB 240 having a plurality of TLB entries 252. In one embodiment, there are a sufficient quantity of TLB entries 252 to cover all of the translatable addresses in the entire GART range 184 (FIG. 4). In this embodiment, system logic 154 (FIG. 3) includes a block of registers to implement the TLB 240. In another embodiment, system logic 154 (FIG. 3)

includes a fast memory portion, such as cache SRAM, to implement the TLB 240.

Figure 6B:
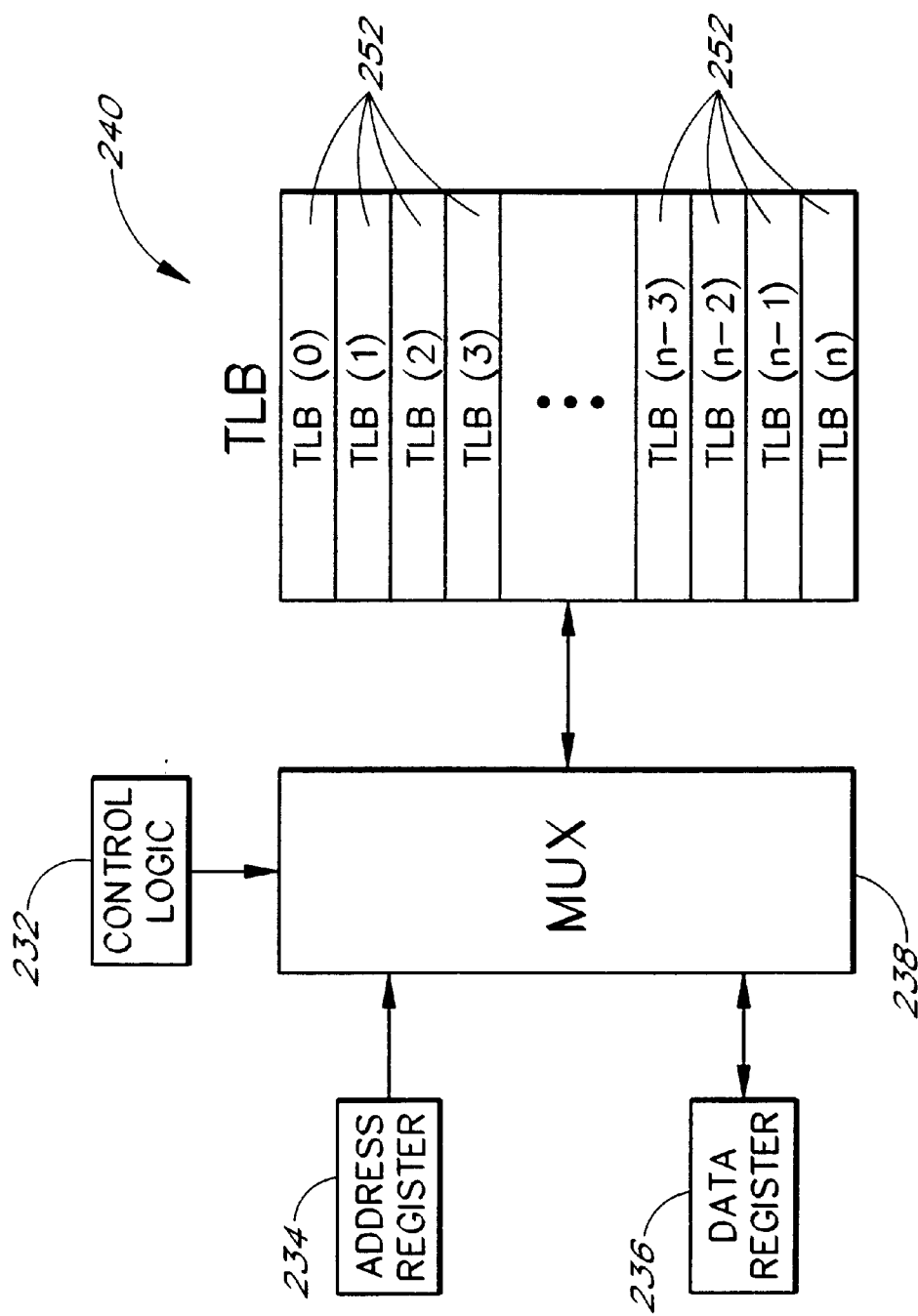
FIG. 6b is a block diagram illustrating one embodiment of an interface for the direct access of a translation look aside buffer (TLB) of one embodiment of the present invention.

FIG. 6b illustrates the use of registers to provide direct read and write access to the TLB entries 252. In one embodiment, a TLB 240 operates as a memory cache for the most recently used PTEs. In contrast, the interface of FIG. 6b enables direct access of TLB entries 252 to reduce latency and memory requirements. In this embodiment, control logic 232 receives a configuration bit from the processor 152 (FIG. 3) to disable the cache like operation of the TLB 240, thus enabling a direct access mode to the TLB 240 controlled by software. In the direct access mode, the processor 152 (FIG. 3) loads a TLB address into Address Register 234. Control logic 232 provides the TLB address in Address Register 234 to the Mux 238 for selection of a TLB entry referenced by the TLB address. In a read operation, the TLB 240 returns the contents of the TLB entry referenced by the TLB address to the Mux 238, which in turn passes the contents of the TLB entry to the Data Register 236 for storage. The processor 152 (FIG. 3) then reads the Data Register 236 to obtain the contents of the desired TLB address. In a write operation, the processor 152 (FIG. 3) loads data to be written to the TLB 240 into the Data Register 236. Control logic 232 provides the data in Data Register 236 to the Mux 238, which then passes the data to the TLB 240 for storage in the TLB entry referenced by the TLB address stored in Address Register 234.

For example, suppose the processor 152 (FIG. 3) needs to update TLB(1) with the value 0×12345678 and verify storage of 0×12345678 in TLB(1). The processor 152 (FIG. 3) writes the TLB address corresponding to TLB(1) into the Address Register 234 and the value 0×12345678 into Data Register 236. Control Logic 232 provides the contents of Address Register 234, the TLB(1) address, to the Mux 238 for selection of TLB(1). The Mux 238 then passes the value 0×12345678 from Data Register 236 to the TLB 240 for storage in TLB(1). To verify the write operation, the processor 152 (FIG. 3) now executes a read command. As Address Register 234 still holds the TLB(1) address, control logic 232 provides the TLB(1) address from Address Register 234 to the Mux 238 for selection of TLB(1). The TLB 240 returns the contents of the TLB(1), 0×12345678, to the Mux 238, which in turn passes the value 0×12345678 to the Data Register 236 for access by the processor 152 (FIG. 3). In this manner, the embodiment of FIG. 6b provides a mechanism for indirect addressing, whereby individual TLB entries may be directly accessed.

Figure 7:
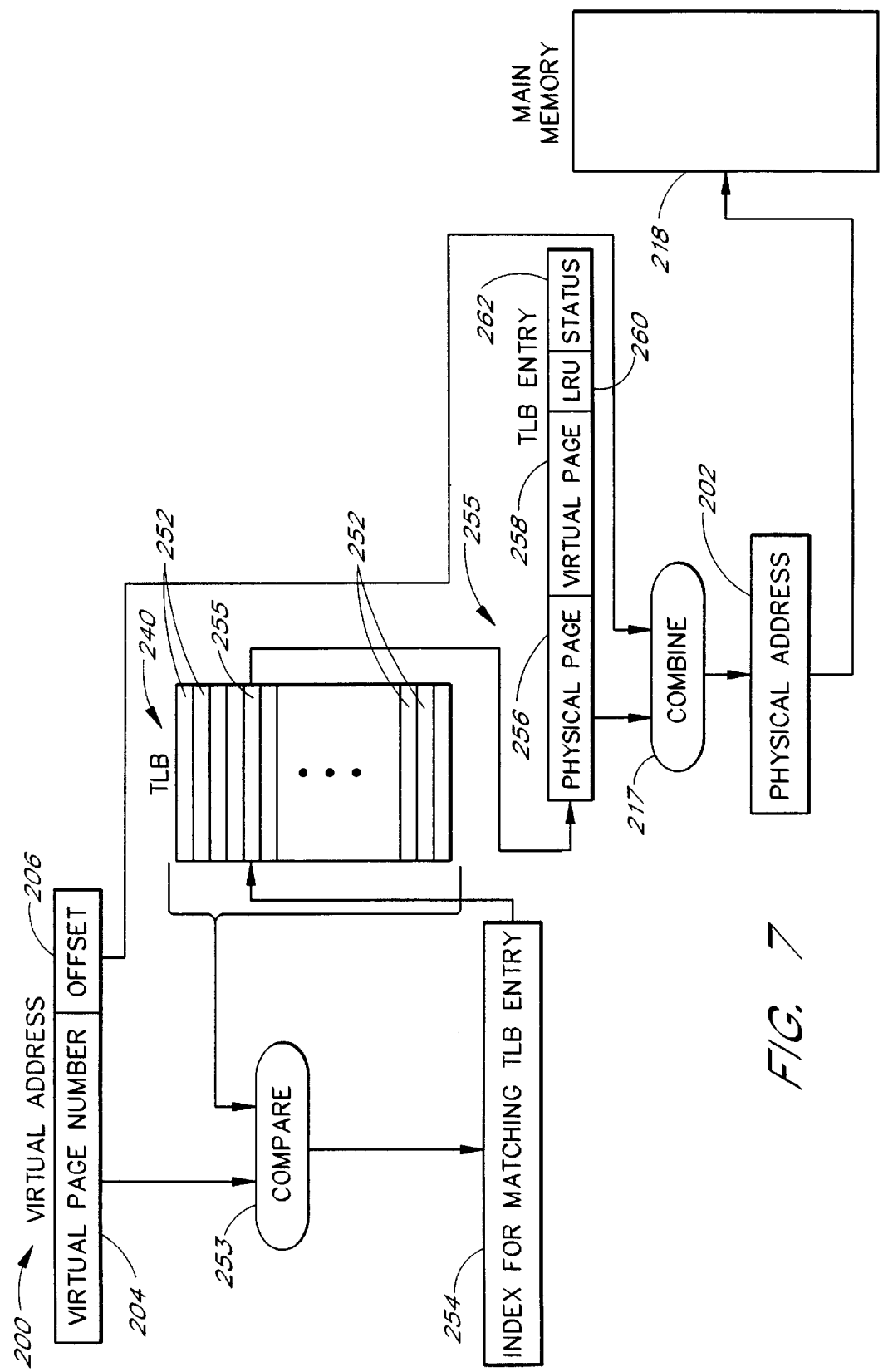
FIG. 7 is a diagram illustrating the translation of a virtual address to a physical address using the TLB of one embodiment of the present invention.

FIG. 7 illustrates the operation of a TLB 240 to provide translation of a virtual address 200 to a physical address 202 to retrieve the desired information from the main memory 218. The TLB 240 comprises a plurality of TLB entries 252, each entry having a virtual page field as described with reference to FIG. 6a. To determine if a desired translation exists in the TLB 240, the contents of the virtual page number field 204 are compared at 253 to the contents of the virtual page fields of each of the plurality of TLB entries 252 in the TLB 240. For example, the contents of the virtual page field 246 (FIG. 6a) of TLB entry 242 (FIG. 6a) are compared at 253 to the contents of the virtual page number field 204 (FIG. 7) and no match is found. Upon finding a match, an index 254 corresponding to the matching TLB entry 255 is used to retrieve the contents of the matching TLB entry 255 from the TLB 240. The contents of the physical page field 256 of the matching TLB entry 255 are combined at 217 with the contents of the offset field 206 of the virtual address 200 to form the physical address 202, which references a location in main memory 218 holding the desired information. Note that a status indicator 262 of the matching TLB entry 255 indicates whether the contents of the physical page field 256 are valid and, if so, a LRU counter 260 is updated.

Figure 8:
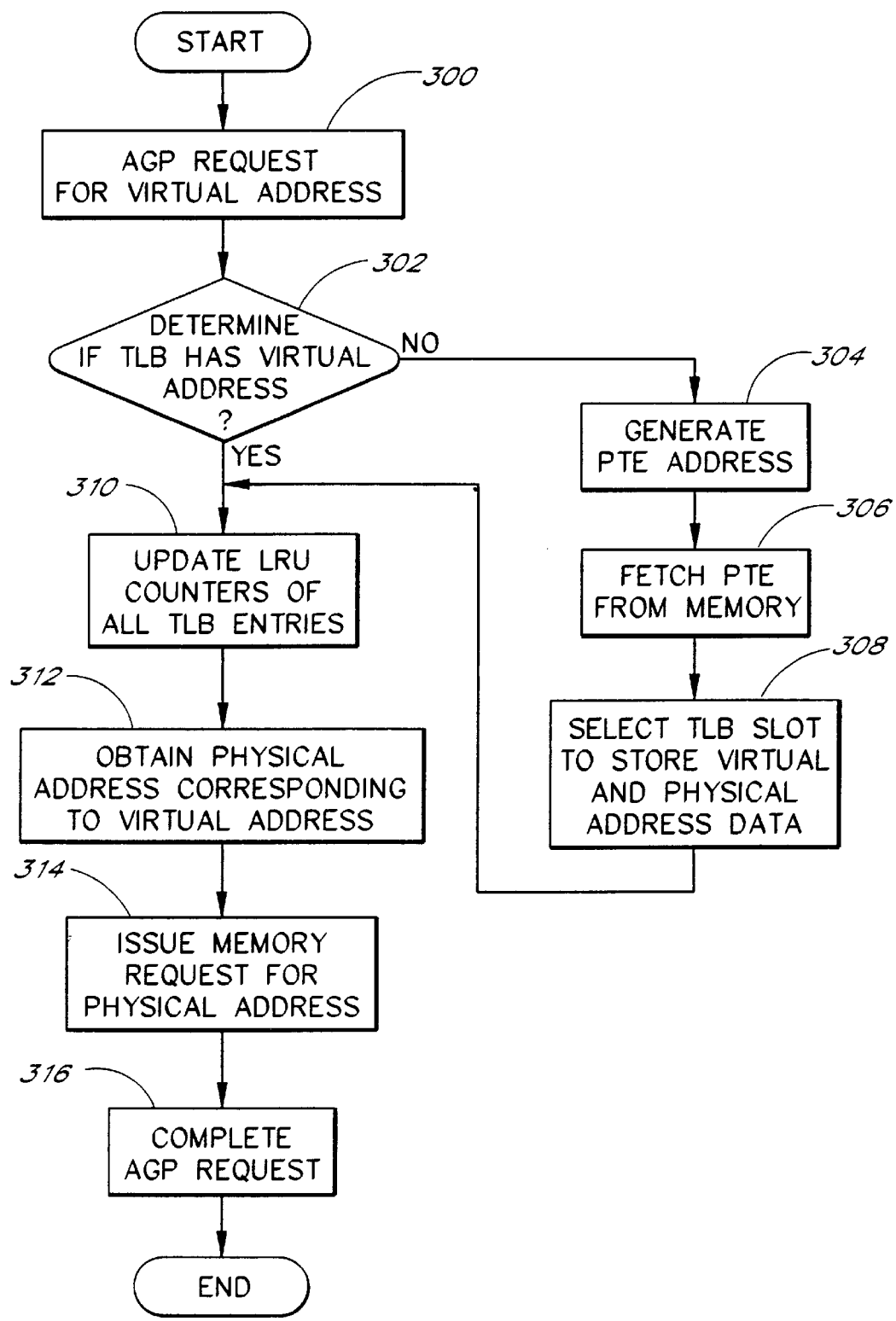
FIG. 8 is a flowchart illustrating the method of processing an AGP request of the present invention.

Referring now to FIG. 8, a flowchart illustrates a method of using the present invention. At state 300, the system logic 154 (FIG. 3) receives an AGP request for data referenced by a virtual address 200 (FIG. 6a). At state 302, the system logic 154 (FIG. 3) determines if the TLB 240 (FIG. 6a) has the requested virtual address 200 (FIG. 6a). If the requested virtual address 200 (FIG. 6a) is not in the TLB 240 (FIG. 6a), the system logic 154 obtains the virtual to physical address translation from the GART table 210 (FIG. 6a) located in main memory 218 (FIG. 6a). At state 304, the PTE Address 214 (FIG. 6a) is generated by combining the GART base address 212 (FIG. 6a) with the contents of the virtual page number field 204 (FIG. 6a) of the virtual address 200 (FIG. 6a). At state 306, the system logic 154 (FIG. 3) fetches a GART PTE 220 (FIG. 5b) corresponding to the PTE Address 214 (FIG. 6a) from the main memory 218 (FIG. 6a). Upon retrieving the GART PTE 220 (FIG. 5b), the system moves to state 308 wherein a TLB entry slot 242 (FIG. 6a) in the TLB 240 (FIG. 6a) is selected to store the physical translation information for the virtual address 200 (FIG. 6a). The virtual to physical address translation proceeds to state 310 as for the circumstance where the requested virtual address 200 (FIG. 6a) exists in the TLB 240 (FIG. 6a).

At state 310, the LRU counters 248 (FIG. 6a) of all TLB entries 252 (FIG. 6a) are updated to reflect the most recent access of the TLB 240 (FIG. 6a). At state 312, the physical address 202 (FIG. 7) corresponding to the virtual address 200 (FIG. 7) is formed by combining the contents of the physical page field 256 (FIG. 7) with the offset 206 (FIG. 7) of the virtual address 200 (FIG. 7). At state 314, the System logic 154 (FIG. 3) then issues a memory request to retrieve the contents of the physical address 202 (FIG. 7). Lastly, the AGP request is completed at state 316.

Figure 9:
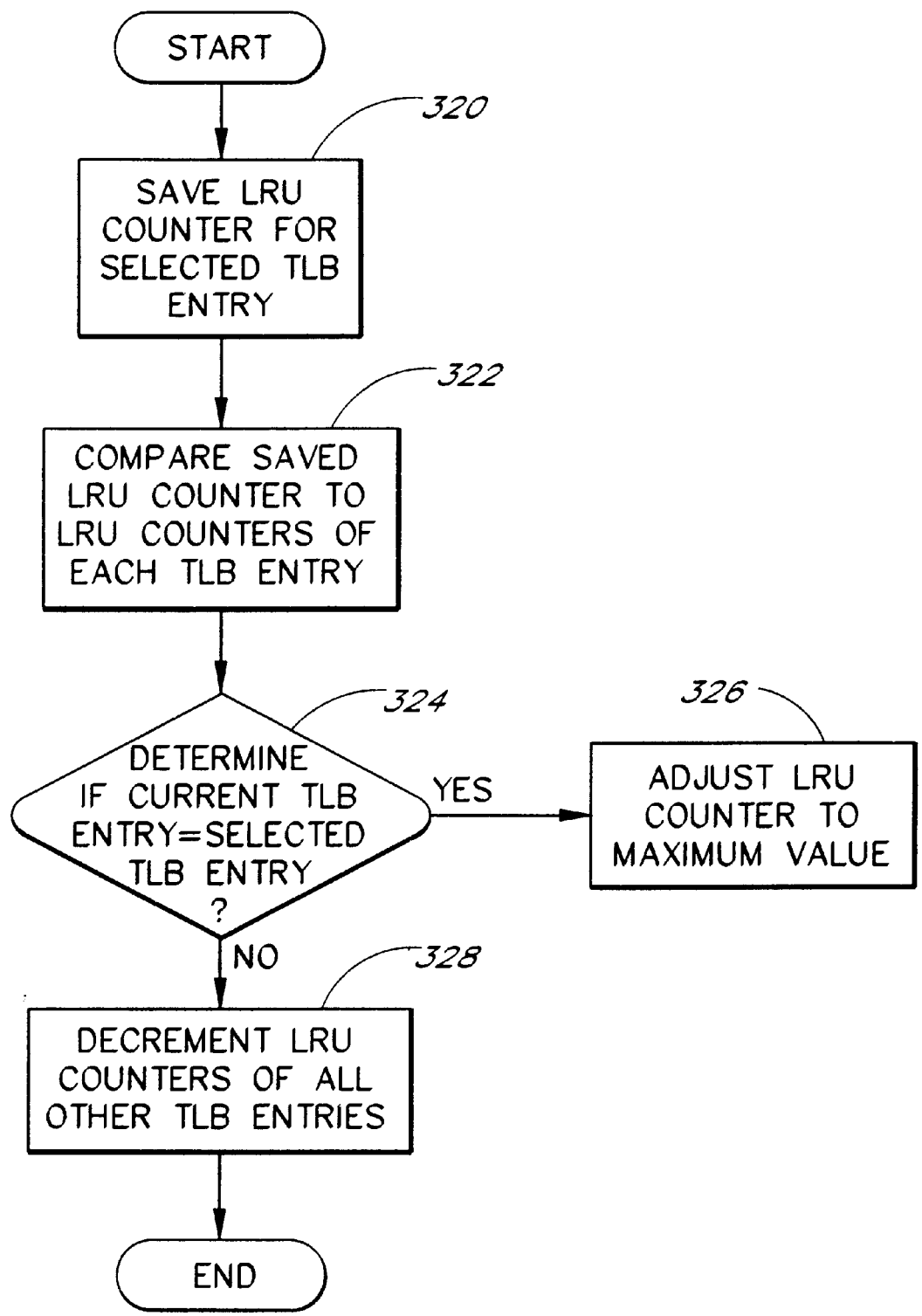
FIG. 9 is a flowchart illustrating the method of updating a least recently used (LRU) counter of one embodiment of the present invention.

Referring now to FIG. 9, a flowchart illustrates one embodiment of a process for updating the LRU counters of all TLB entries 310 (FIG. 8). At state 320, the LRU counter for the selected TLB entry 242 (FIG. 6a) is saved for subsequent comparison to the LRU counters of each of the TLB entries. This comparison takes place at state 322. If the current TLB entry for comparison is determined to be the same as the selected TLB entry 242 (FIG. 6a) at state 324, the LRU counter of the selected TLB entry 242 (FIG. 6a) is set to the maximum value at state 326. Otherwise, the LRU counter of the TLB entry for comparison is decremented at state 328. In one embodiment, the LRU counter is decremented by one. Thus, when a TLB hit occurs, the LRU counter of the selected TLB entry 255 (FIG. 7) is loaded to its maximum value and the LRU counters of all other TLB entries 252 (FIG. 7) are decremented.

Figure 10:
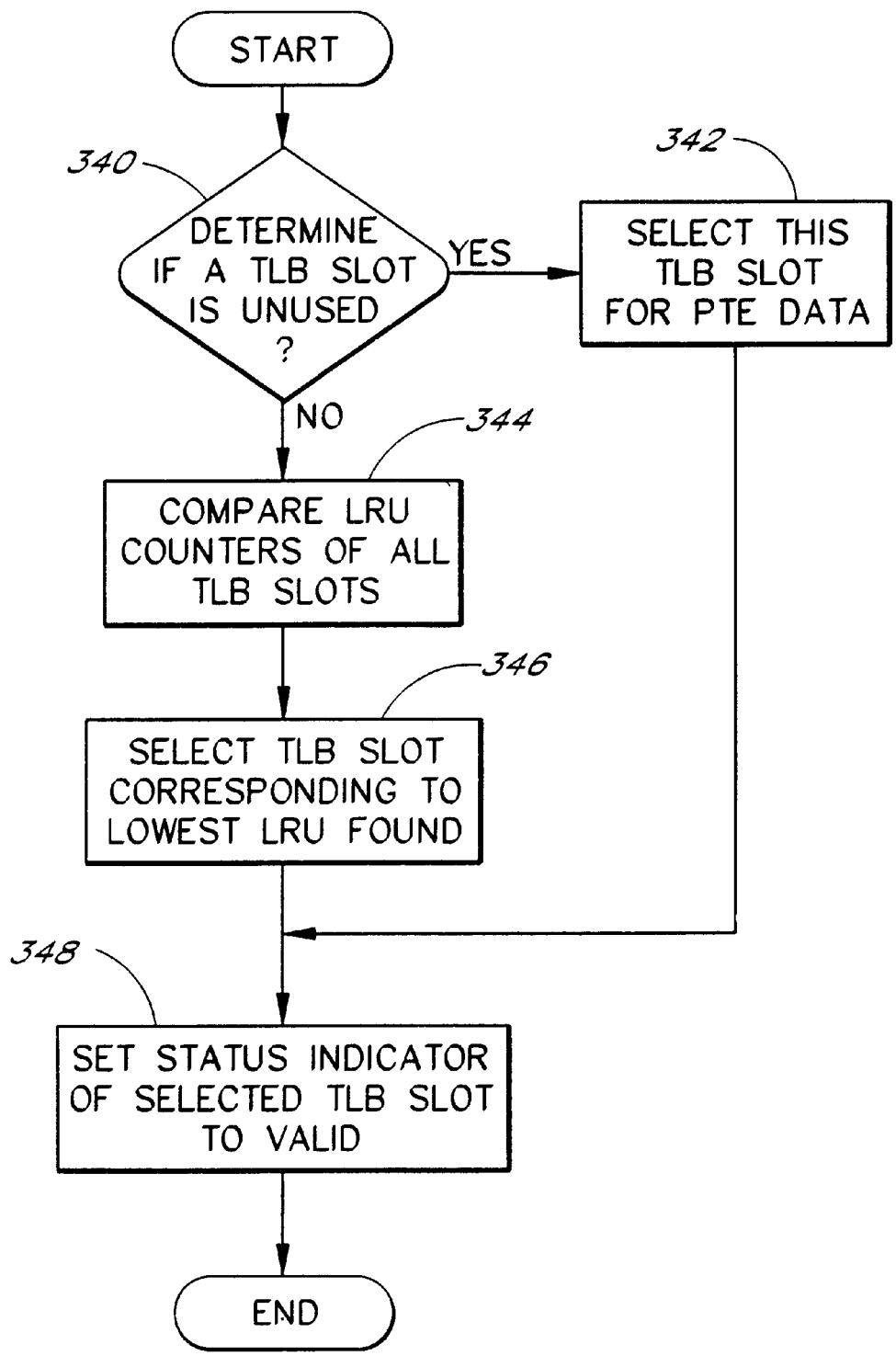
FIG. 10 is a flowchart illustrating the method of selecting a slot to store a TLB entry of one embodiment of the present invention.

Referring now to FIG. 10, a flowchart illustrates one embodiment of a process for selecting a TLB slot 308 (FIG. 8). At state 340, system logic 154 (FIG. 3) determines if a TLB slot is not currently used. If an unused TLB slot is found, this slot is selected at state 342 to store the physical translation information in the TLB entry 242 (FIG. 6a). Otherwise, the LRU counters of all TLB slots are compared at state 344. When the TLB entry having the minimum LRU counter value is found, this slot is selected at state 346 to store the physical translation information in the TLB entry 242 (FIG. 6a). Lastly, at state 348, the status indicator 250 (FIG. 6a) of the selected TLB slot is set to indicate a valid entry.

Figure 11:
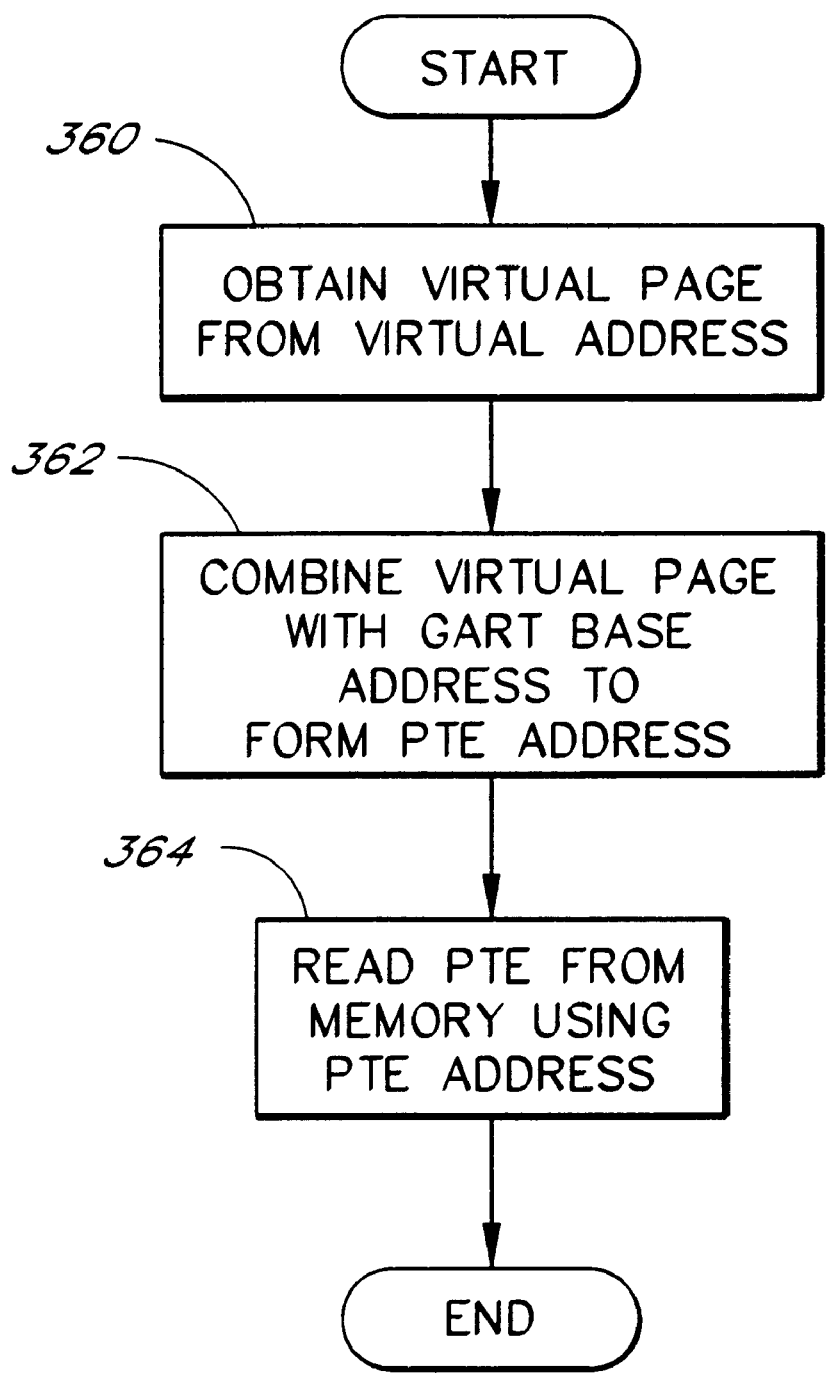
FIG. 11 is a flowchart illustrating the method of fetching a page table entry (PTE) of one embodiment of the present invention.

Referring now to FIG. 11, a flowchart illustrates one embodiment of a process for fetching a GART PTE 306

(FIG. 8). At state 360, the system logic 154 (FIG. 3) obtains the virtual page number 204 (FIG. 5a) from the virtual address 200 (FIG. 5a). At state 362, the virtual page number 204 (FIG. 5a) is then combined with the GART base address 212 (FIG. 5a) to form a PTE Address 214 (FIG. 5a). Lastly, at state 364, system logic 154 (FIG. 3) reads the PTE from main memory 218 (FIG. 5a) using the PTE Address 214 (FIG. 5a).

The present invention advantageously overcomes several limitations of existing technologies and alternatives. For example, current technologies store graphics data in expensive local frame buffer memory. In contrast, the present invention enables storing, addressing and retrieving graphics data from relatively inexpensive main memory without the bandwidth limitations of current system bus designs. Furthermore, by defining the GART in software, the present invention eliminates many hardware dependencies. Instead of expensive circuit redesigns and fabrication, the present invention enables inexpensive software modifications to address future partitioning and remapping circuitry as well as any current or future compatibility issues. Moreover, the present invention enables computer manufacturers to investigate cost and performance compromises at the system integration stage rather than at the hardware design and development stage. For example, computer manufacturers may implement the entire GART in main memory (instead of registers) to reduce register costs, while caching an image of the most recently used GART entries in a few registers to reduce access times to main memory. The invention thus provides substantial flexibility to address ever changing cost and performance requirements well after the completion of the hardware design. In contrast to existing hardware design paradigms, the present invention enables rapid and inexpensive modifications to address evolving customer and market needs.

In addition, the present invention is useful for computer system applications that flexibly allocate memory resources which are tightly coupled to the computer hardware. For example, the invention is useful in situations where hardware ascertains and reports state information, such as diagnostic data or vital product data. The invention allows for flexible reporting of the state information under software control, instead of hardware control where functions are hardwired into circuitry. Similarly, the invention provides alternate mechanisms to access internal registers for diagnostic purposes. Lastly, the invention provides a mechanism whereby status can be flexibly programmed into memory. Thus, the invention enables any device, such as a network device broadcasting bits in a serial stream, to flexibly indicate status information using a medium other than memory.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced with their scope.

What is claimed is:

1. A computer system, comprising:
   a processor;
   a main memory in communication with the processor;
   a graphics processor configured to access the main memory using a virtual address;
   a graphics port in communication with the main memory and the graphics processor;
   a graphics address remapping table (GART) configured for access by the graphics processor and including at least one page table entry (PTE) which is configurable in size and providing information which is used to directly translate the virtual address to a physical address corresponding to a location in the main memory; and
   wherein the virtual address includes a first portion and a second portion, the first portion corresponding to a PTE in the GART and wherein the second portion and the information provided by the PTE are combined to provide the physical address.

2. The computer system of claim 1, wherein the first portion of the virtual address comprises a virtual page number field.

3. The computer system of claim 1, wherein the second portion of the virtual address comprises an offset field.

4. The computer system of claim 1, wherein the physical address references a location in the main memory storing data.

5. The computer system of claim 1, wherein the GART is stored in the main memory.

6. The computer system of claim 1, wherein the GART is configured by loading at least one configuration register during boot up of the computer system.

7. The computer system of claim 6, wherein the at least one configuration register includes a base address of the GART.

8. The computer system of claim 6, wherein the at least one configuration register includes a translation size defining the size of the translation information.

9. The computer system of claim 6, wherein the at least one configuration register includes a boundary address defining the lowest address of a GART range.

10. The computer system of claim 6, wherein an initialization BIOS loads the at least one configuration register.

11. The computer system of claim 6, wherein an operating system API loads the at least one configuration register.

12. The computer system of claim 1, wherein the at lease one page table entry further comprises:
    a physical page translation field having translation information; and
    a feature bits field having at least one indicator defining an attribute of the physical page translation field.

13. The computer system of claim 12, wherein the attribute comprises status.

14. The computer system of claim 12, wherein the at least one indicator comprises a page table entry valid indicator having at least one bit.

15. The computer system of claim 12, wherein the at least one indicator comprises a page read indicator having at least one bit.

16. The computer system of claim 12, wherein the at least one indicator comprises a page write indicator having at least one bit.

17. The computer system of claim 12, wherein the physical page translation field is of configurable length.

18. The computer system of claim 12, wherein the physical page translation field is defined using a mask register.

19. The computer system of claim 12, wherein the feature bits field is of configurable length.

20. The computer system of claim 12, wherein the feature bits field is defined using a mask register.

21. A computer system, comprising:
a processor;
a main memory in communication with the processor;
a graphics processor configured to access the main memory using a virtual address;
a graphics port in communication with the main memory and the graphics processor;
a graphics address remapping table (GART) configured for access by the graphics processor including at least one page table entry (PTE) which is configurable in size and providing information which is used to translate the virtual address to a physical address corresponding to a location in the main memory; and
a translation lookaside buffer (TLB) receiving a portion of the virtual address, the TLB having at least one TLB entry, wherein each of the at least one TLB entries includes a virtual page field and a corresponding physical page field;
wherein if the portion of the virtual address matches the virtual page field of one TLB entry, the TLB provides translation information from the physical page field of the one TLB entry to form the physical address corresponding to a location in the main memory;
wherein if the portion of the virtual address does not match the virtual page field of one TLB entry, the GART provides translation information referenced by the portion of the virtual address to form the physical address corresponding to a location in the main memory; and
wherein the virtual address includes a first portion and a second portion, the first portion corresponding to a PTE in the GART and wherein the second portion and the information provided by the PTE are combined to provide the physical address.

22. The computer system of claim 21, wherein the first portion of the virtual address comprises a virtual page number field.

23. The computer system of claim 21, wherein the second portion of the virtual address comprises an offset field.

24. The computer system of claim 21, wherein the physical address references a location in the main memory storing data.

25. The computer system of claim 21, wherein the GART is stored in the main memory.

26. The computer system of claim 21, wherein the GART is configured by loading at least one configuration register during boot up of the computer system.

27. The computer system of claim 26, wherein the at least one configuration register includes a base address of the GART.

28. The computer system of claim 26, wherein the at least one configuration register includes a translation size defining the size of the translation information.

29. The computer system of claim 26, wherein the at least one configuration register includes a boundary address defining the lowest address of a GART range.

30. The computer system of claim 26, wherein an initialization BIOS load the at least one configuration register.

31. The computer system of claim 26, wherein an operating system API loads the at least one configuration register.

32. The computer system of claim 21, wherein the at lease one page table entry further comprises:
a physical page translation field having translation information; and
a feature bits field having at least one indicator defining an attribute of the physical page translation field.

33. The computer system of claim 32, wherein the attribute comprises status.

34. The computer system of claim 32, wherein the at least one indicator comprises a page table entry valid indicator having at least one bit.

35. The computer system of claim 32, wherein the at least one indicator comprises a page read indicator having at least one bit.

36. The computer system of claim 32, wherein the at least one indicator comprises a page write indicator having at least one bit.

37. The computer system of claim 32, wherein the physical page translation field is of configurable length.

38. The computer system of claim 32, wherein the physical page translation field is defined using a mask register.

39. The computer system of claim 32, wherein the feature bits field is of configurable length.

40. The computer system of claim 32, wherein the feature bits field is defined using a mask register.

41. The computer system of claim 21, wherein the at least one TLB entry includes translation information from the GART.

42. The computer system of claim 21, wherein the at least one TLB entry further comprises a least recently used (LRU) counter.

43. The computer system of claim 21, wherein the at least one TLB entry further comprises a status indicator to indicate if the TLB entry is valid.

44. The computer system of claim 21, wherein the virtual address includes a virtual page number field and an offset field.

45. A computer system including a diagnostic tool for testing a translation lookaside buffer (TLB), comprising:
a processor;
a main memory in communication with the processor;
a graphics processor configured to access the main memory using a virtual address;
a graphics port in communication with the main memory and the graphics processor;
a graphics address remapping table (GART) configured for access by the graphics processor and including at least one page table entry (PTE) which is configurable in size and provides information which is used to directly translate the virtual address to a physical address corresponding to a location in the main memory, the virtual address having a first portion and a second portion, the first portion corresponding to a PTE in the GART and the second portion and the information provided by the PTE provide the physical address;
an interface in communication with the processor, the interface receiving a portion of the virtual address;
a TLB in communication with the processor through the interface, the TLB having at least one TLB entry including information which is used to translate the virtual address to a physical address; and
wherein the interface provides read and write access to the TLB entry.

46. The computer system of claim 45, wherein the interface further comprises:

a data register;

an address register receiving a portion of the virtual address; and a multiplexer in communication with the address register, the TLB and the data register, wherein the multiplexer selects the TLB entry according to the portion of the virtual address and provides access to the selected TLB entry using the data register.

47. The computer system of claim 45, wherein the portion of the virtual address comprises a virtual page number field.

48. The computer system of claim 45, wherein the at least one TLB entry includes translation information from a graphics address remapping table.

49. The computer system of claim 45, wherein the at least one TLB entry further comprises a least recently used (LRU) counter.

50. The computer system of claim 45, wherein the at least one TLB entry further comprises a status indicator to indicate if the TLB entry is valid.

51. The computer system of claim 45, wherein the virtual address includes a virtual page number field and an offset field.

* * * * *